United States Patent [19]

Euzen

[11] Patent Number: 5,830,822
[45] Date of Patent: Nov. 3, 1998

[54] HIGH TEMPERATURE RESISTANT OXIDATION CATALYST, A PROCESS FOR ITS PREPARATION AND A COMBUSTION PROCESS USING THIS CATALYST

[75] Inventor: Patrick Euzen, Rueil Malmaison, France

[73] Assignee: Institut Francais du Petrole, Rueil Malmaison, France

[21] Appl. No.: 496,957

[22] Filed: Jun. 30, 1995

[30] Foreign Application Priority Data

Jul. 1, 1994 [FR] France .................................. 94 08262

[51] Int. Cl.⁶ ........................... B01J 21/04; B01J 101/32; B01J 23/34; B01J 23/00
[52] U.S. Cl. ........................... 502/355; 502/324; 502/328; 502/329; 502/341; 502/342; 502/343
[58] Field of Search ..................................... 502/303, 304, 502/324, 328, 329, 332, 336, 341, 340, 342, 343, 355; 431/7

[56] References Cited

U.S. PATENT DOCUMENTS 4,857,499  8/1989  Ito et al. .................................. 502/326

FOREIGN PATENT DOCUMENTS 0318808  11/1987  European Pat. Off. ........ B01D 53/36

*Primary Examiner*—Glenn Caldarola
*Assistant Examiner*—Alexander G. Ghyka
*Attorney, Agent, or Firm*—Millen, White, Zelano, & Branigan, P.C.

[57] ABSTRACT

A non-selective high temperature resistant oxidation catalyst and a process for the preparation of this catalyst is described. The catalyst mainly has the formula $A_{1-x}B_yC_zAl_{12-y-z}O_{19-\delta}$, where A represents at least one element selected from the group formed by barium, strontium and the rare earths; B represents at least one element with valency Y selected from the group formed by Mn, Co and Fe; C represents at least one element selected from the group formed by Mg and Zn; x has a value of 0 to 0.25, y has a value of 0.5 to 3 and z has a value of 0.01 to 3; the sum y+z has a maximum value of 4 and $\delta$ has a value which is determined as a function of the respective valencies X and Y of elements A and B and the value of x, y and z and is equal to $1-\frac{1}{2}\{(1-x)X+yY-3y-z\}$. The catalysts of the invention are particularly for use in processes for the catalytic combustion of hydrocarbons, carbon monoxide, hydrogen or mixtures thereof.

20 Claims, 8 Drawing Sheets

HIGH TEMPERATURE RESISTANT OXIDATION CATALYST, A PROCESS FOR ITS PREPARATION AND A COMBUSTION PROCESS USING THIS CATALYST

BACKGROUND OF THE INVENTION

The present invention concerns a non selective high temperature resistant oxidation catalyst, a process for the preparation of the catalyst and its use in the catalytic combustion of hydrocarbons, carbon monoxide, hydrogen or mixtures thereof.

Conventional combustion, carried out in the presence of a flame and usually employed in hydrocarbon combustion processes, such as that of methane, is a process which is difficult to control. In addition to the formation of carbon dioxide and water, within a well determined range of air/hydrocarbon concentrations, such combustion leads to the production of pollutants such as carbon monoxide and oxides of nitrogen. On the other hand, catalytic combustion produces few pollutants such as $NO_x$ and CO. Further, the introduction of a catalyst means that the total oxidation can be controlled within a wide range of values of the air/hydrocarbon ratio. These can be outside the limits of inflammability for conventional combustion. Still further, catalytic combustion enables a very wide variety of compounds to be burned.

Known combustion catalysts are usually prepared from a monolithic substrate of ceramic or metal on which a fine layer of one or more refractory oxides, usually alumina, is deposited, which has a higher surface area and porosity to that of the monolithic substrate. The active phase composed mainly of platinum group metals is dispersed on this oxide.

In the combustion process, catalysts are subjected to very high temperatures, often greater than 1000° C. During use of these catalysts at these high temperatures, the catalyst degrades and the catalytic performance is reduced. Of the possible causes for this degradation in performance, sintering of the support and sintering of the active phase and/or encapsulation thereof by the support are among those most frequently blamed.

In order to limit the drop in the specific surface area of the support, a number of stabilizer have been proposed for addition to the alumina during its preparation. Examples are:

- a rare earth oxide, for example as described in French patent French application No. 2,257,335 or French patent application French application No. 2,596,379;
- an alkaline-earth oxide, for example as described in French patents French application Nos. 2,140,575 and 2,271,160.

Lanthanum and barium are cited among the most effective stabilizer for alumina. Supports which are stabilized by these techniques clearly have increased durability over pure alumina. However, at temperatures greater than or equal to 1200° C. as demanded by a combustion process, these supports have insufficient stability over time to satisfy these demands.

Catalyst supports have been developed which are based on a mixture of alumina and alkaline-earth or rare earth oxides with the crystal structure of a lamellar hexaaluminate (as described in "Structural inorganic Chemistry", A. F. Wells, 5th edition, Clarendon Press, Oxford). The following supports are thus known:

$Ln_2O_3/11 \sim 14\text{-}Al_2O_3$, where Ln=La, Nd or Pr, as described, for example, in European patent application European Patent No. 130 835;

$MO\text{-}6Al_2O_3$; where M=Ba, Ca or Sr, as described, for example, in European patent European Patent No. 222,471;

$MgAl_{11}LnO_{19}$ or $Mg_xAl_yLn_zO_m$ where Ln=La, Pr or Nd; x=0.1–10; y=5–40; z=0.1–4; m is optional, as described, for example, in Japanese patent application JP-A-02/126939.

After prolonged calcination of these supports at temperatures of more than 1100°–1200° C., some of these hexaaluminate type combustion catalyst supports have a resistance to sintering which is greater than that or aluminas stabilized by lanthanum or barium. However, these supports do not solve the problem or stability of the active phase which is also responsible for performance degradation.

In order to limit sintering in the active metallic phase, the addition of various mainly transition metal based oxides has been proposed. Catalysts prepared by this technique are particularly described in U.S. Pat. No. 4,857,499. Some of these catalysts have increased durability over the active metallic phase alone. However, because of the volatility of platinum group metals and their oxides, these catalysts have insufficient stability over time leading to a degradation in activity.

Oxides based on rare earth and/or alkaline-earth transition metals and transition metals are resistant to sintering. The following are known:

perovskites:

$La_{(1+x)/2}Sr_{(1+x)/2}Co_{1-x}Me_xO_3$, where Me=Fe, Mn, Cr, V or Ti, as described, for example, in European patent European Patent No. 89,199, oxides formed from a precursor of the type:

$Ni_{6-z}Al_xMg_zLa_y(CO_3)_{(x+y)/2}(OH)_{12+2(x+y)}nH_2O$ as described, for example, in European patent European Patent No. 44,117.

These oxides, however, are insufficiently resistant to sintering under the very severe temperature conditions of catalytic combustion.

In order to overcome these problems, the incorporation of a transition metal into a hexaaluminate has been proposed, as described in particular in U.S. Pat. No. 4,788,174.

The proposed oxidation catalyst was as follows:

$Al_{1-z}C_zB_xAl_{12-y}O_{19-\alpha}$ where A=Ba, Ca or Sr; C=K or Rb and $(0 \leq z \leq 0.4)$ where B=Mn, Fe, Co, Ni, Cu or Cr, $(0.1 \leq x \leq 4)$ and $(x \leq y \leq 2x)$, and $\alpha = 1 - \frac{1}{2}\{X - z(X-Y) + xZ - 3y\}$.

However, the potassium and rubidium which increase the catalytic activity are volatile compounds. This volatility results in a loss in the initial observed activity. Further, these volatile compounds are corrosive and are thus liable to damage the reactors and lines.

SUMMARY OF THE INVENTION

We have discovered that the catalytic activity can surprisingly be improved by incorporating at least one element selected from magnesium and/or zinc into these catalysts, attenuating the problems described above.

The present invention provides a non-selective high temperature resistant oxidation catalyst and has formula $A_{1-x}B_yC_zAl_{12-y-z}O_{19-\delta}$, where A represents at least one element selected from the group formed by barium, strontium and the rare earths; B represents at least one element with valency Y selected from the group formed by Mn, Co and Fe; C represents at least one element selected from the group formed by Mg and Zn; x has a value of 0 to 0.25, y has a value of 0.5 to 3 and z has a value of 0.01 to 3; the sum y+z has a maximum value of 4 and δ has a value which is determined as a function of the respective valencies X and Y of elements A and B and the value of x, y and z and is equal to $1-\frac{1}{2}\{(1-x)X+yY-3y-z\}$.

In a variation of the invention, at least one precious metal from the platinum group is deposited on the surface of the catalyst mainly with formula $A_{1-x}B_yC_zAl_{12-y-z}O_{19-\delta}$ or it can be incorporated into the catalyst mainly with formula $A_{1-x}B_yC_zAl_{12-y-z}O_{19-\delta}$ during its formation. The precious metal is preferably platinum and/or palladium and/or rhodium.

The catalyst of the present invention preferably has an atomic ratio of A over the sum B+C+Al or about 0.06 to 0.1, and $A_{1-x}B_yC_zAl_{12-y-z}O_{19-\delta}$ is a lamellar hexaaluminate in which element B and/or element C is/are incorporated into the structure in another preferred feature of the catalyst of the invention, element A is lanthanum or barium, element B is manganese and element C is magnesium.

The catalysts of the invention have improved performance particularly in the catalytic combustion of hydrocarbons, carbon monoxide, hydrogen or mixtures thereof. They can also be used in any catalytic process requiring high temperatures.

The present invention also concerns a process for the preparation of a non-selective high temperature resistant catalyst, consisting of dissolving and mixing a water and/or alcohol-soluble aluminium compound, a water and/or alcohol-soluble compound of an element A selected from barium, strontium and the rare earths, a water and/or alcohol-soluble compound of an element B selected from Mn, Co and Fe, and a water and/or alcohol-soluble compound of an element C selected from by magnesium and zinc, such that the atomic ratio of A over the sum B+C+Al is about 0.06 to 0.1, the atomic ratio of B over the sum B+C+Al is about 0.04 to 0.2, and the atomic ratio of C over the sum B+C+Al is about 0.01 to 0.2, to obtain a homogeneous solution, then transforming the homogeneous solution into a solid product constituted by the mixed oxide or a solid solution with the same homogeneity and the same composition of elements A, B, C and Al. Any process known to the skilled person which can transform an, aqueous or non-aqueous solution into a mixed oxide (or a solid solution) can be used. Particular examples are co-precipitation, hydrolysis, the sol-gel process, cryodessication, spray drying, complexation, etc. . . . These processes (the list is not limiting) directly (or indirectly with separation of an intermediate solid phase) lead to the desired mixed oxide or solid solution; the oxide is calcined at a temperature of at least 900° C. for a period which is sufficient to form the mixed oxide or solid solution and be detected by X-ray diffraction.

The catalyst of the present invention is preferably produced by co-precipitation or by alkoxide hydrolysis.

When the atomic ratio of A over the sum B+C+Al is 1/12 for the alkaline-earths and 1/11 to 1/14 for the rare earths, formulation $A_{1-x}B_yC_zAl_{12-y-z}O_{19-\delta}$ has maximum thermal stability. However, the atomic ratio of A over the sum B+C+Al is not limited to these values: preferably, it is close to these values and is about 0.06 to 0.1. This range of preferred ratios gives the catalytic formulation of the present invention, $A_{1-x}B_yC_zAl_{12-y-z}O_{19-\delta}$, its properties of resistance to sintering at high temperatures. For values for the atomic ratio of A over the sum B+C+Al of much less than 0.06, the alpha alumina known as corundum appears in the majority during calcining. For values for the atomic ratio of A over the sum B+C+Al which are greatly above 0.1, new crystalline structures form depending on the nature of element A: $AO-Al_2O_3$, $A_2O_3-Al_2O_3$ etc; these are not as resistant to sintering as compositions $A_{1-x}B_yC_zAl_{12-y-z}O_{19-\delta}$ where the atomic ratio of A over the sum B+C+Al is between about 0.06 and 0.1. The $A_{1-x}B_yC_zAl_{12-y-z}O_{19-\delta}$, which constitutes the major portion of the catalyst of the present invention, has a lamellar hexaaluminate type crystalline structure close to or similar to that of magnetoplumbite (for example $MO-6Al_2O_3$, where M=Ba, Ca or Sr) and/or β-alumina and/or $La_2O_3/11\sim14-Al_2O_3$. This crystalline structure (FIG. 1) is considered to be the cause of the superior thermal resistance properties of the catalyst of the present invention. This crystalline structure appears at temperatures which are less than or equal to the transition temperature for alpha alumina, thus avoiding the alpha transition and the resultant drop in the specific surface area and reduction in catalytic activity.

Elements B and C, which are the active components of he catalyst, are fixed or incorporated into the lamellar hexaaluminate structure described above. This incorporation or fixing could be the origin of the good sintering resistance of active elements b and C and as a consequence of its high retention of catalytic activity with time. Further, the proximity of the two active elements B and C due to the hexaaluminate structure causes a synergistic effect on the catalytic activity. This synergistic effect may provide the catalyst of the present invention $A_{1-x}B_yC_zAl_{12-y-z}O_{19-\delta}$ its superior catalytic activity.

The values of y and z, which represent the composition of active elements B and C in the formula of the catalyst of the present invention $A_{1-x}B_yC_zAl_{12-y-z}O_{19-\delta}$, are preferably between 0.5 and 3 and between 0.01 and 3 respectively, more preferably between 0.5 and 2 and between 0.01 and 2. If these values y and z are respectively less than 0.5 and 0.01, there are not enough active components in the formulation and the catalytic activity is not sufficiently high to satisfy the demands of a combustion process. On the other hand, if values x and y for the active elements are higher than 3, most of the catalytic components will not be able to incorporate themselves advantageously into the lamellar hexaaluminate type structure $A_{1-x}B_yC_zAl_{12-y-z}O_{19-\delta}$ and they will not be able to contribute to the catalytic activity. They form a distinct oxide phase in the catalyst of the present invention $A_{1-x}B_yC_zAl_{12-y-z}O_{19-\delta}$. These oxide phase(s) can in certain cases be distinguished from the catalyst of the present invention $A_{1-x}B_yC_zAl_{12-y-z}O_{19-\delta}$ using X ray diffraction.

$A_{1-x}B_yC_zAl_{12-y-z}O_{19-\delta}$, forming the major portion of the catalyst of the present invention, has a lamellar hexaaluminate type crystalline structure which is close to that of magnetoplumbite and/or β-alumina. It is considered that this crystalline structure is the cause of the superior thermal resistance properties of the catalyst of the present invention. At least a portion of formulation $A_{1-x}B_yC_zAl_{12-y-z}O_{19-\delta}$ preferably has a lamellar hexaaluminate type crystal structure where element B and/or C is incorporated or fixed into the structure.

In a variation of the invention, the catalysts can also contain a platinum group metal. This platinum group metal can be deposited on the surface of the catalyst of the present invention (by impregnation, for example) or it can be incorporated during preparation. It may be of advantage to impregnate or incorporate a platinum group metal into the sintering resistant catalyst of the present invention to improve its activity at low temperatures. By incorporating the platinum group metal during preparation, the sintering resistance of the platinum group metal can also be improved. These catalysts, impregnated with a platinum group metal or containing a platinum group metal incorporated during preparation, are also included in the present invention.

Formulation $A_{1-x}B_yC_zAl_{12-y-z}O_{19-\delta}$ is mainly constituted by a composite mixture of four oxides: the oxide of an element A, the oxide of an element B, the oxide of an element C and aluminium oxide. These different oxides will be described in more detail below.

As a precursor for the aluminium which constitutes the major element in obtaining the high temperature resistant catalyst of the present invention, an alumina is preferably used which belongs to the transition aluminas and hydrated aluminas: gamma aluminas, boehmite, gibbsite, bayerite, etc. . . when using a traditional method of reaction between powders in the solid state. When using a co-precipitation technique to obtain the high temperature resistant catalyst of the present invention, a soluble aluminium compound is preferably used, such as aluminium nitrate, aluminium sulphate, aluminium chloride, etc. . . . When hydrolysis of an organic compound is used to obtain the high temperature resistant catalyst of the present invention, a soluble aluminium compound such as an aluminium alkoxide is preferably used.

The precursor for element B and/or C which is mainly responsible for the catalytic activity of the formulation can be a solid compound (oxide, hydroxide, carbonate, hydroxycarbonate or an insoluble salt) or a soluble compound (nitrate, sulphate, chloride or alkoxide) depending on the technique used. Element B in the catalyst of the present invention is preferably Mn, Fe and/or Co, more preferably Mn and/or Co. Regarding element C, Mg is preferably used.

Depending on the different aluminium, manganese and magnesium precursors used, different preparation methods for the catalysts or catalyst supports can be used: solid state reaction, complexation, alkoxide hydrolysis, co-precipitation, impregnation or a sol-gel technique.

The invention provides these formulations in the form of monoliths, spherules, tablets, extrudates or other forms normally used for catalysts and catalyst supports.

The invention also proposes the use of these catalysts deposited on various ceramic or metallic substrates. These substrates can be ceramic or metallic monoliths with a cellular structure (rolls or stacks of metallic sheets or the combination of metal fibers or metal wires in the form of a fibrous structured Age monolith). The ceramic can be mullite, cordierite, α alumina, zirconia, alumina titanate, silicon carbide, silicon nitride or mixtures thereof. The metal alloys used preferably have refractory properties. They can, for example, be compounds of iron, chromium, aluminium and cerium or yttrium such as Gilphal 135 steel from Imphy. The metallic substrate can be pretreated with an oxidizing treatment at a temperature of between 700° C. and 1200° C., preferably between 800° C. and 1000° C.

Preparation of these catalysts deposited on a substrate consists of a coating step during which the substrate is immersed in a suspension containing the precursors of the catalyst components, then dried and calcined after removing the excess suspension.

In general, the process for the preparation of these catalysts comprises one or more intermediate and/or final calcining steps which transforms the catalyst precursors into the catalyst of the present invention.

In order to obtain the catalyst of the present invention, calcining is preferably carried out at a temperature greater than or equal to 900° C. When calcining is carried out at a temperature of less that 900° C., the precursors do not transform themselves into the desired oxide within a practical time period. According to the X-ray diffraction spectra (FIG. 1) of the catalysts of the present invention, the crystalline structure of the compound obtained is either amorphous or close to that of a lamellar hexaaluminate. This crystalline structure depends on the calcining conditions, in particular the temperature and duration of calcining. The crystalline structure of the catalyst of the present invention is closer to the crystalline structure of a lamellar hexaaluminate the higher the calcining temperature. However, for temperatures of 1500° C. or more, the specific surface area of the hexaaluminate obtained tends to reduce sharply due to the accelerated crystal growth in the material at this temperature. It is thus necessary to adapt the calcining conditions to the desired specific surface area to obtain the catalyst of the present invention with a specific surface area which is compatible with a catalytic combustion process.

The calcining conditions are selected as a function of the conditions of use of the catalyst. In a high temperature catalytic combustion process, for example, the catalyst is subjected to temperatures of 1300° C. or more. Calcining is thus preferably carried out at a temperature of 1300° C. or more to limit modifications to the catalyst during use as far as possible. At these temperatures, conventional catalyst supports of the alumina type or improved alumina type doped with a rare earth and/or alkaline-earth transform into alpha alumina. This transformation into alpha alumina is accompanied by a dramatic fall in the specific surface area and a substantial drop in catalytic activity.

In order to obtain the catalyst of the present invention, calcining is preferably carried out at a temperature of 900° C. or more. The calcining conditions, temperature and time, mainly depend on the maximum temperature at which the catalyst will be used. Preferred calcining conditions are between more than one hour at 1000° C. and less than one hour at 1400° C.

Different methods of preparing the catalysts or catalyst supports can be used, such as reactions between powders in the solid state, alkoxide hydrolysis, complexation, co-precipitation, impregnation, a sol-gel method, . . . .

The high temperature resistant non-selective oxidation catalyst of the present invention can be prepared from a mixture of powdered solid pigments (oxides, hydroxides, carbonates, hydroxycarbonates or insoluble salts), but preferably it is obtained using a process involving dissolving and mixing a water and/or alcohol-soluble aluminium compound, a water and/or alcohol-soluble compound of element A selected from barium, strontium and the rare earths, a water and/or alcohol-soluble compound of an element B selected from Mn, Co and Fe, and a water and/or alcohol-soluble compound of an element C selected from Mg and Zn, such that the atomic ratio of A over the sum B+C+Al is about 0.06 to 0.1, the atomic ratio of B over the sum B+C+Al is about 0.04 to 0.2, and the atomic ratio of C over the sum B+C+Al is about 0.01 to 0.2, then precipitating, hydrolyzing and/or thermally decomposing to produce a product in solution, extracting the product from the solution, pre-calcining the extracted product at between 200° C. and 600° C. and calcining the product at a temperature which is greater than at least 900° C. Of these methods, co-precipitation and alkoxide hydrolysis are preferably used. While the following detailed description specifically concerns co-precipitation, alkoxide hydrolysis could equally well be used. Similarly, lanthanum, manganese and magnesium were selected in the following description to illustrate the preparation process, however other elements could also have been used.

She catalyst of the present invention is preferably prepared as follows. In a first phase, a mixture containing a water-soluble aluminium salt, a water-soluble lanthanum salt, a water-soluble manganese salt and a water-soluble magnesium salt is prepared. In a second phase, the hydroxides of the soluble salts used in the first phase are co-precipitated. Co-precipitation can be effected by adding a precipitating agent to the solution or adding the mixture of soluble salts to the precipitating agent. Precipitation is preferably effected under stationary conditions, the solution containing the soluble salts and that containing the precipitating agent being added simultaneously, the flow rates being controlled by the pH measured, in an overflow reactor where precipitation occurs. Co-precipitation is effected within a range of pH which allows complete co-precipitation of all the precursor constituents of the catalyst of the present invention. In the study example, precipitation is carried out at a pH of between 7 and 12. In addition to the hydroxides of the Mn, La, Al and Mg precursors which precipitated out, undesirable compounds are also formed which are eliminated by filtration and/or simply washing with water. The co-precipitate is then washed and precalcined between 200° C. and 650° C., and the product obtained is calcined at a temperature between 900° C. and 1500° C. for 5 to 30 hours to transform it into the catalyst or the present invention.

Examples of soluble aluminium compounds which can be used are aluminium nitrate, aluminium chloride, etc. Examples of soluble manganese compounds which can be used are manganese nitrate, manganese chloride, etc. Examples of soluble lanthanum compounds which can be used are lanthanum nitrate, lanthanum chloride, etc. Examples of soluble magnesium compounds which can be used are magnesium nitrate, magnesium chloride, etc. Examples of precipitation agents are sodium hydroxide, sodium carbonate, potassium hydroxide and ammonia. The precipitation agents are selected so that all the precursors of the catalyst of the present invention are precipitated together. It may sometimes be necessary to use a mixture of co-precipitating agents: sodium hydroxide+sodium carbonate, for example, to obtain co-precipitation of all the precursors. Thus, in the case of a catalyst of the present invention containing strontium and barium, it is preferable that the co-precipitating agent mixture contains sodium carbonate. Separate precipitation steps can also be taken for the different precursors, then mixing the products obtained together to obtain the precursor for the catalyst of the present invention.

Further, the catalysts used in accordance with the present invention can advantageously be treated, as is well known to the skilled person, with porogens such as those based on cellulose, naphthalene, natural gums, and synthetic polymers to produce the desired porosity.

It is considered that the crystalline structure which is close to or part of the lamellar hexaaluminate family in which element B and/or element C are incorporated into the structure is the origin of the superior thermal resistance of the catalyst of the present invention. Further, element C which increases the catalytic activity does not transform into a volatile compound and remains incorporated into the structure, ensuring that the catalytic properties are stable with time.

The catalysts of the invention have improved performances, in particular in catalytic combustion processes for hydrocarbons such as methane, carbon monoxide, hydrogen or mixtures thereof. They can also be used in any other catalytic process requiring high temperatures.

The catalytic combustion reactions can comprise one or more catalytic steps. In general, the catalysts in the first catalytic zone, whose role is mainly to initiate the combustion reaction, are catalysts based on precious metals on stabilized alumina. The alumina stabilizer is generally selected from alkaline-earths, rare earths, silica or tin. The catalysts of the present invention can be used in these combustion reactors, preferably they are used in one or more catalytic steps where the gas inlet temperature is between 600° C. and 900° C. and where the gas outlet temperature is between 800° C. and 1500° C.

The following examples illustrate the invention without in any way limiting its scope.

The various precursors used were commercially available products from Prolabo.

The crystalline structure of the catalysts was determined using X ray diffraction (Philips PW 1050). The elemental composition was determined using X ray fluorescence (Philips PW 1480).

The oxidoreduction power of the catalysts, which is directly correlated to catalytic activity, was measured using oxygen thermodesorption and temperature programmed oxidation ($\chi$-Sorb-Vinci Technologies).

The specific surface areas were measured using the standard BET method ($\Phi$-Sorb-Vinci Technologies).

EXAMPLES

Example 1

Preparation of Catalyst (C1) in Accordance with the Invention

Aluminium nitrate $Al(NO_3)_3,9H_2O$, Lanthanum nitrate $La(NO_3)_3$, manganese nitrate $Mn(NO_3)_2,4H_2O$ and magnesium nitrate $Mg(NO_3)_2,6H_2O$ were added to deionized water. When the crystals were completely dissolved, stirring was continued for one hour to homogenise the mixture.

Ammonia was used to co-precipitate the hydroxides and obtain an overall pH of 9. The precipitate obtained was filtered and washed with distilled water to eliminate the excess ammonia and the ammonium nitrate resulting from the precipitation. The filtration cake was oven dried for 12 hours at 120° C. then calcined in air in an alumina crucible at 600° C. for four hours, then at 1200° C. in air for sixteen hours.

A catalyst (C1) was obtained with a Mg/Al ratio of 0.0838 and a Mn/Al ratio of 0.0872.

The composition of the catalyst can be represented by the formula $La_{0.78}Mg_{0.9}Mn_{0.9}Al_{11}O_{19-\delta}$.

Figure 1:
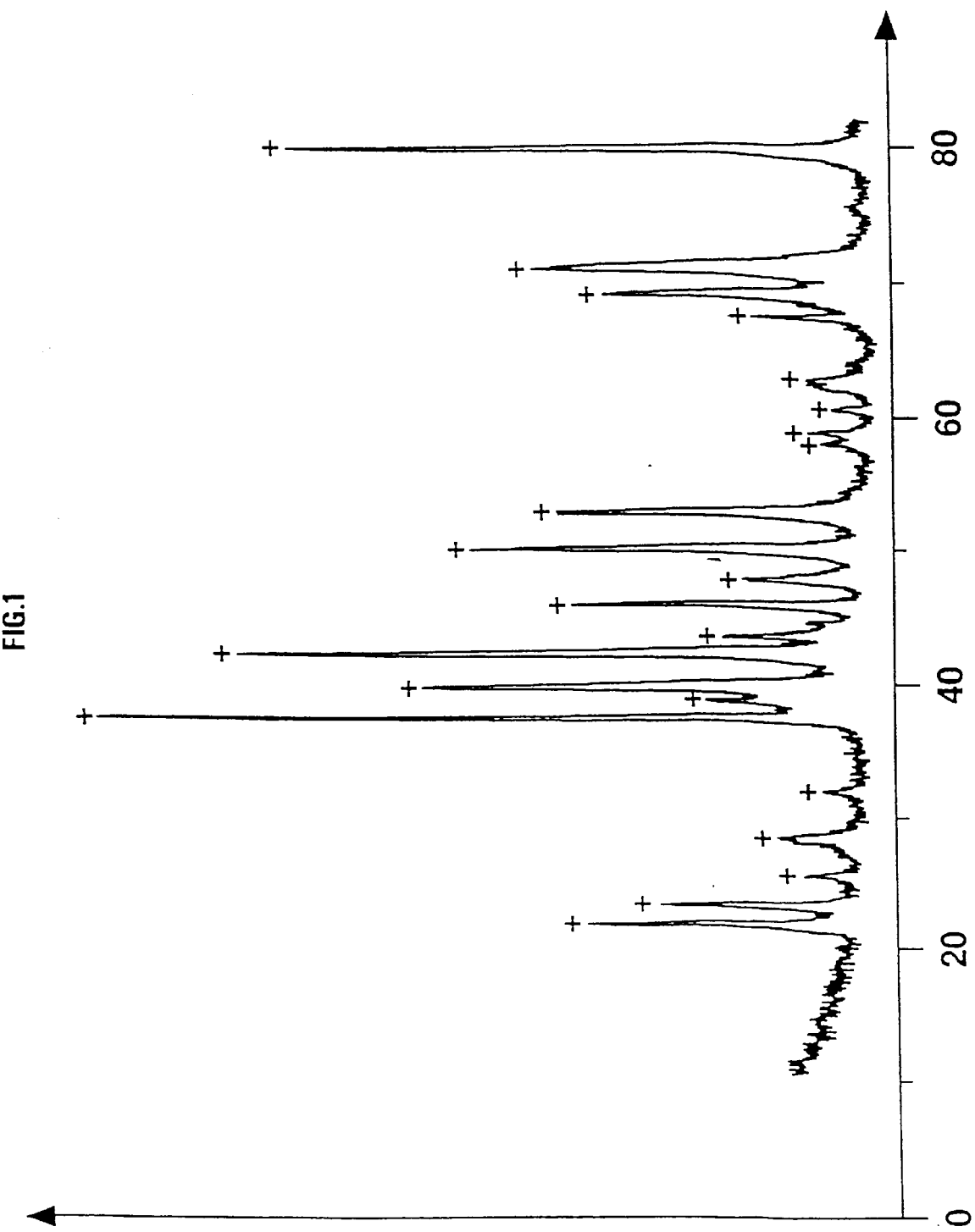
FIG. 1 represents the X ray diffraction spectrum of catalyst (C1) of the invention after calcining in air at 1200° C. for 16 hours. The points (+) designate the peaks corresponding to catalyst (C1).

FIG. 1 shows that catalyst (C1) had the characteristic peaks of a hexaaluminate where Mn and Mg were incorporated into the structure. No formation of alpha alumina was observed.

The BET surface area of catalyst (C1) was of the order of 17 m²/g.

Example 2 (comparative)

Preparation of Prior Art catalyst (C2)

In order to demonstrate the superior stability of catalyst (C1) compared with an alumina stabilized with Lanthanum, catalyst (C2) was prepared in strictly similar fashion to that of Example 1 above without either magnesium or manganese and with a lower lanthanum content.

A catalyst (C2) was obtained with a La/Al ratio of 0.026.

Figure 2:
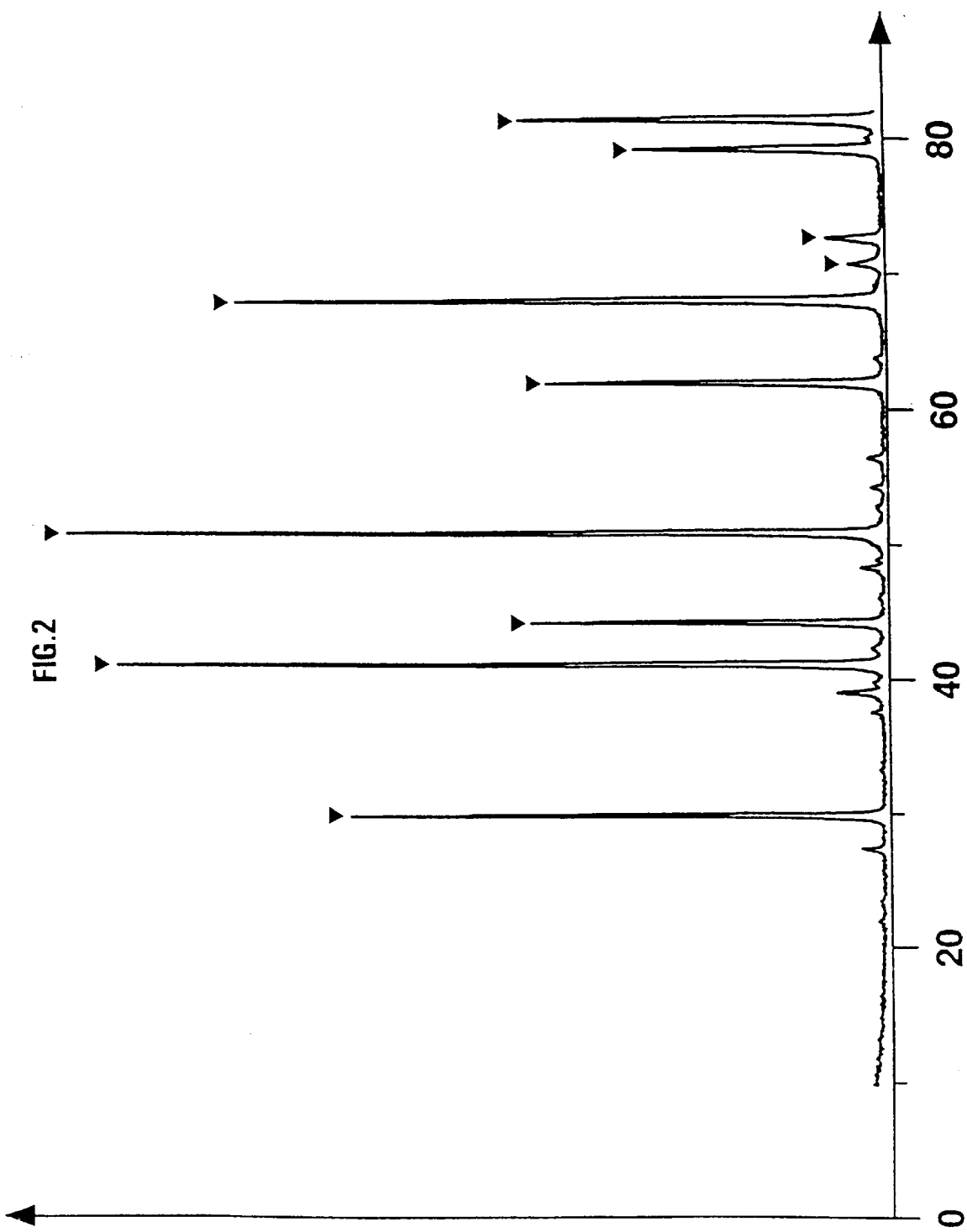
FIG. 2 represents the X ray diffraction spectrum of comparative catalyst (C2) after calcining in air at 1200° C. for 16 hours. The points ($\alpha$) designate the peaks corresponding to alumina.

FIG. 2 shows that catalyst (C2) was mostly transformed into alpha alumina with a low specific surface area. The other minor peaks in the X ray diffraction diagram are those of perovskite $LaAlO_3$ and of $LaAl_{11}O_{18}$.

The BET surface area of catalyst (C2) was of the order of 5 m²/g.

Comparison of FIGS. 1 and 2 clearly show the superior thermal stability of catalyst (C1) under severe temperature conditions over stabilised prior art aluminas.

Example 3 (comparative)

Preparation of Prior Art Catalyst (C3)

In order to show the effect of magnesium and manganese on the catalytic activity of catalyst (C1), catalyst (C3) was prepared in strictly similar fashion to that of Example 1 above, the only difference being the absence of magnesium and manganese in the formulation.

A catalyst (C3) was obtained with a ratio La/Al of 0.071.

Example 4 (comparative)

Preparation of Prior Art Catalyst (C4)

In order to show the effect of magnesium on the catalytic activity of catalyst (C1), a catalyst (C4) was prepared in strictly similar fashion to that of Example 1 above, the only difference being the absence of magnesium in the formulation.

A catalyst (C4) was obtained with a ratio Mn/Al of 0.0714 and a ratio La/Al of 0.077.

Example 5

Catalytic Activity of various Catalysts measured by Thermodesorption and Temperature Programmed Oxidation.

This example collects the results obtained using thermodesorption (TDO) and temperature programmed oxidation (TPO) with catalysts (C1), (C2), (C3) and (C4) described in Examples 1, 2, 3 and 4 respectively.

The tests were carried out by loading 10 g of each of the catalysts in turn into the TDO/TPO apparatus.

The procedure used for thermodesorption was as follows. The sample, calcined at 1200° C. for sixteen hours, was heated to 1000° C. at a race of 20° C./min in a current of helium circulating at 20 cm³/min. The volume of oxygen desorbed between 400° C. and 1000° C. by the catalyst was measured in cm³ of oxygen per gram of catalyst.

The procedure used for temperature programmed oxidation was as follows. Following thermodesorption, the sample was cooled in helium to room temperature. The sample was then heated to 1000° C. at a rate of 5° C./min in a current of helium+2% oxygen circulating at 20 cm³/min. The volume of oxygen consumed by the catalyst between 400° C. and 1000° C. was measured in cm³ of oxygen per gram of catalyst.

The table below shows the results obtained over a range of temperature which shows the differences between the catalysts as regards their ability to function in a high temperature combustion process.

TABLE 1

Physico-chemical characteristics of catalysts determined by X ray fluorescence, volume of oxygen desorbed per gram of catalyst during thermodesorption (TDO) and volume of oxygen consumed per gram of catalyst during temperature programmed oxidation (TPO).

| Example number | Catalyst reference | Atomic ratio Mn/Al | Atomic ratio Mg/Al | Atomic ratio La/Al | S BET (m²/g) | TDO $V_1$ (cc/g) 400–1000° C. | TPO $V_2$ (cc/g) 400–1000° C. |
|---|---|---|---|---|---|---|---|
| Example 1 (inventive) | (C1) | 0.0872 | 0.0838 | 0.071 | 17 | 1.146 | 1.164 |
| Example 2 (comparative) | (C2) | 0.0 | 0.0 | 0.026 | 6 | 0.0 | 0.0 |
| Example 3 (comparative) | (C3) | 0.0 | 0.0 | 0.071 | 22 | 0.0 | 0.0 |
| Example 4 (comparative) | (C4) | 0.071 | 0.0 | 0.077 | 13 | 0.566 | 0.07 |

Catalyst (C3) did not desorb oxygen, contrary to catalyst (C1) in accordance with the invention and catalyst (C3) not capable of consuming oxygen after thermodesorption, contrary to catalyst (C1) in accordance with the invention.

Figure 3:
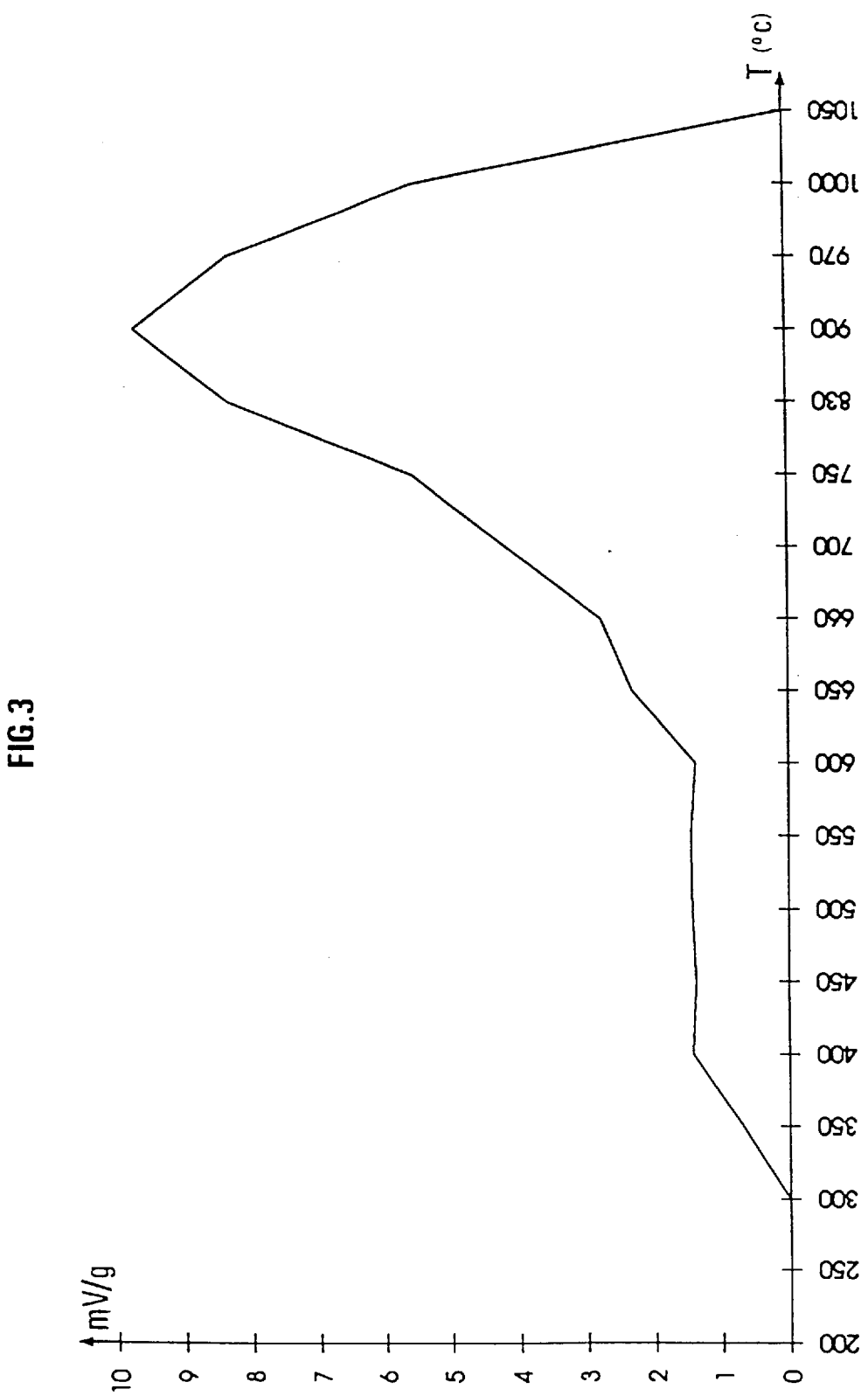
FIG. 3 represents the evolution of the volume of oxygen desorbed by catalyst (C1) (in $cm^3$ of oxygen per gram of catalyst) as a function of temperature during thermodesorption.
Figure 5:
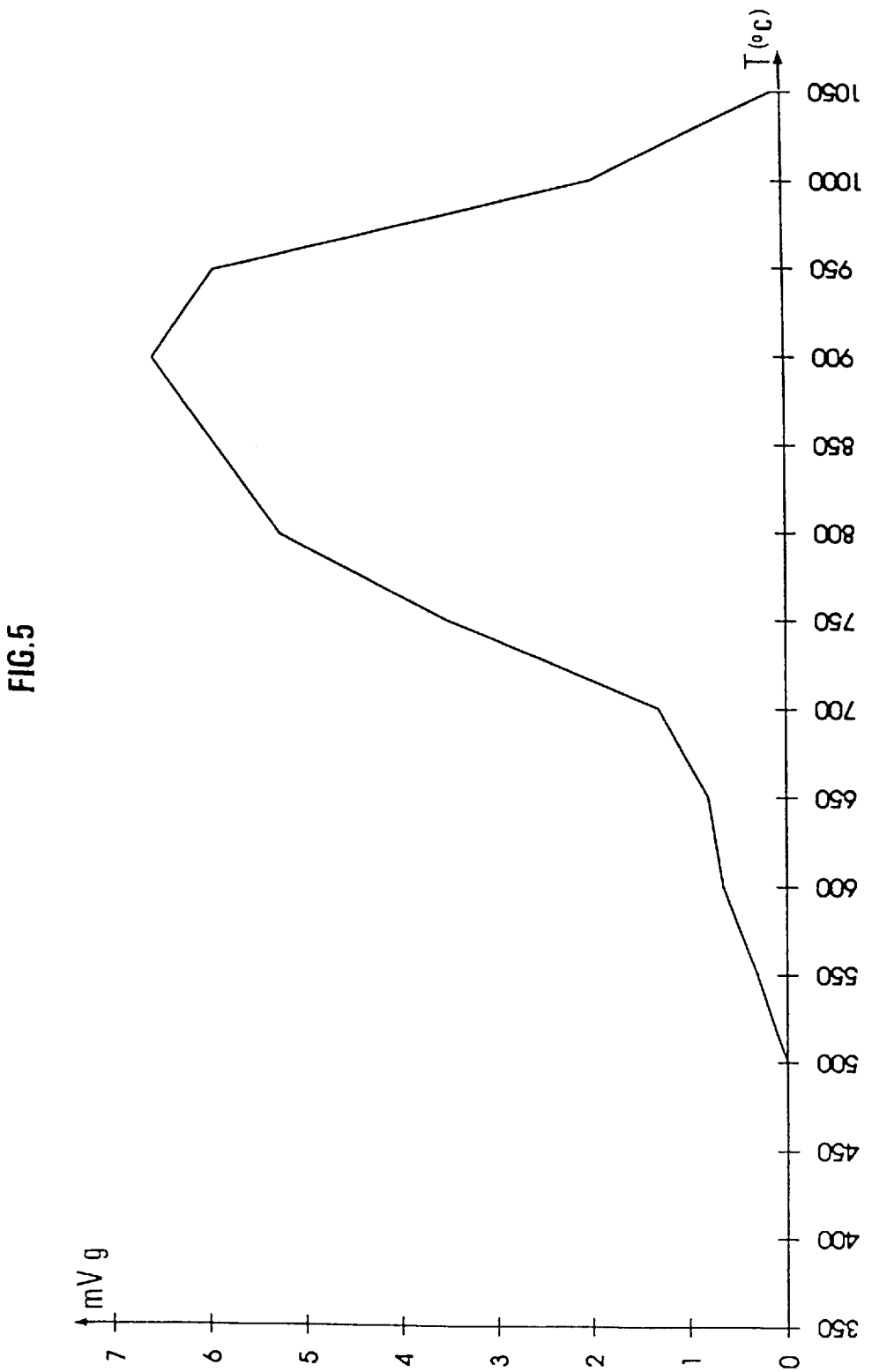
FIG. 5 represents the evolution of the volume of oxygen desorbed by catalyst (C4) (in $cm^3$ of oxygen per gram of catalyst) as a function of temperature during thermodesorption.

Comparison of FIGS. 3 and 5 show that catalyst (C4) desorbed much less oxygen than catalyst (C1) in accordance with the invention.

Figure 4:
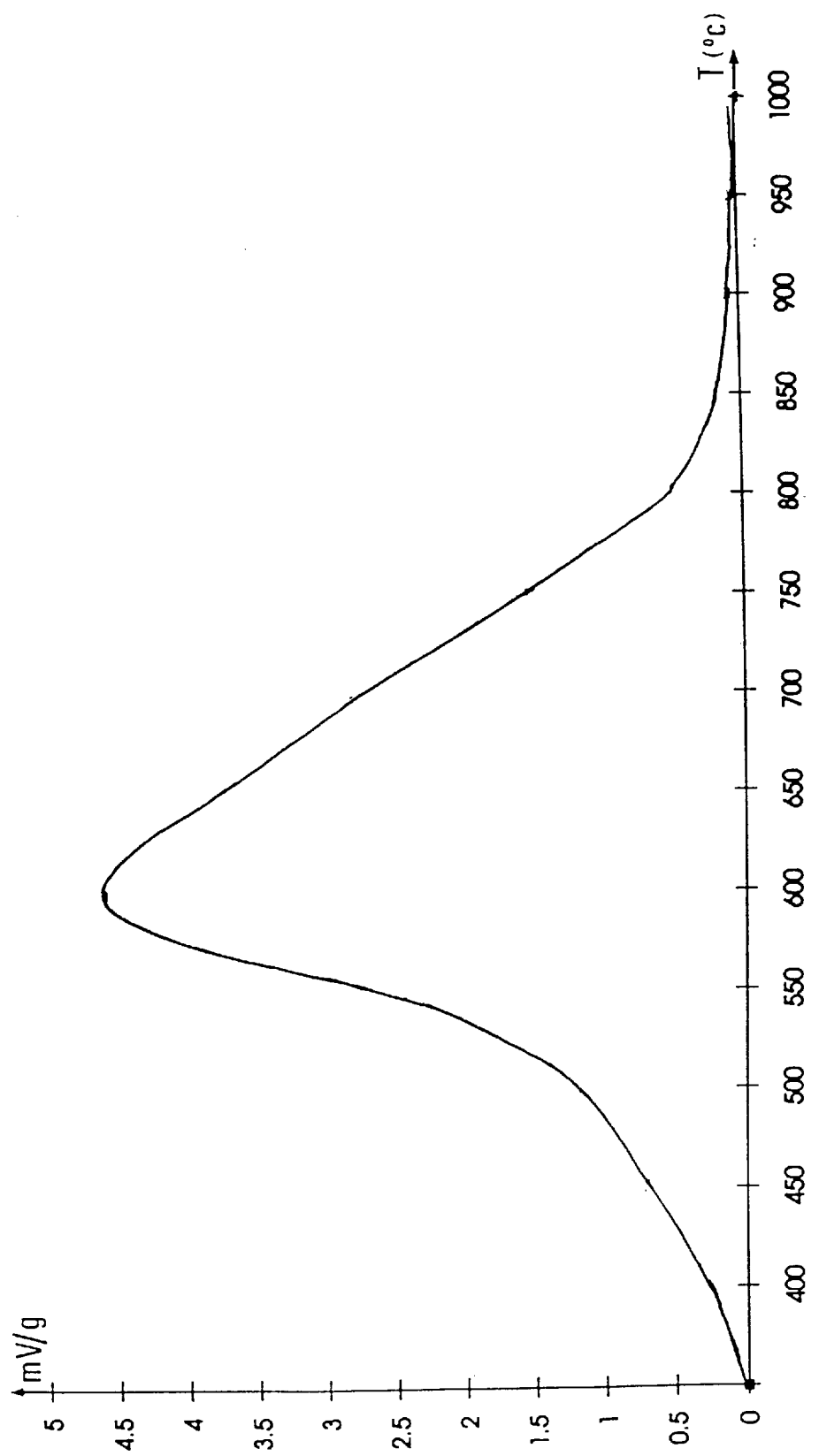
FIG. 4 represents the evolution of the volume of oxygen consumed by catalyst (C1) in $cm^3$ of oxygen per gram of catalyst) as a function of temperature during temperature programmed oxidation.
Figure 6:
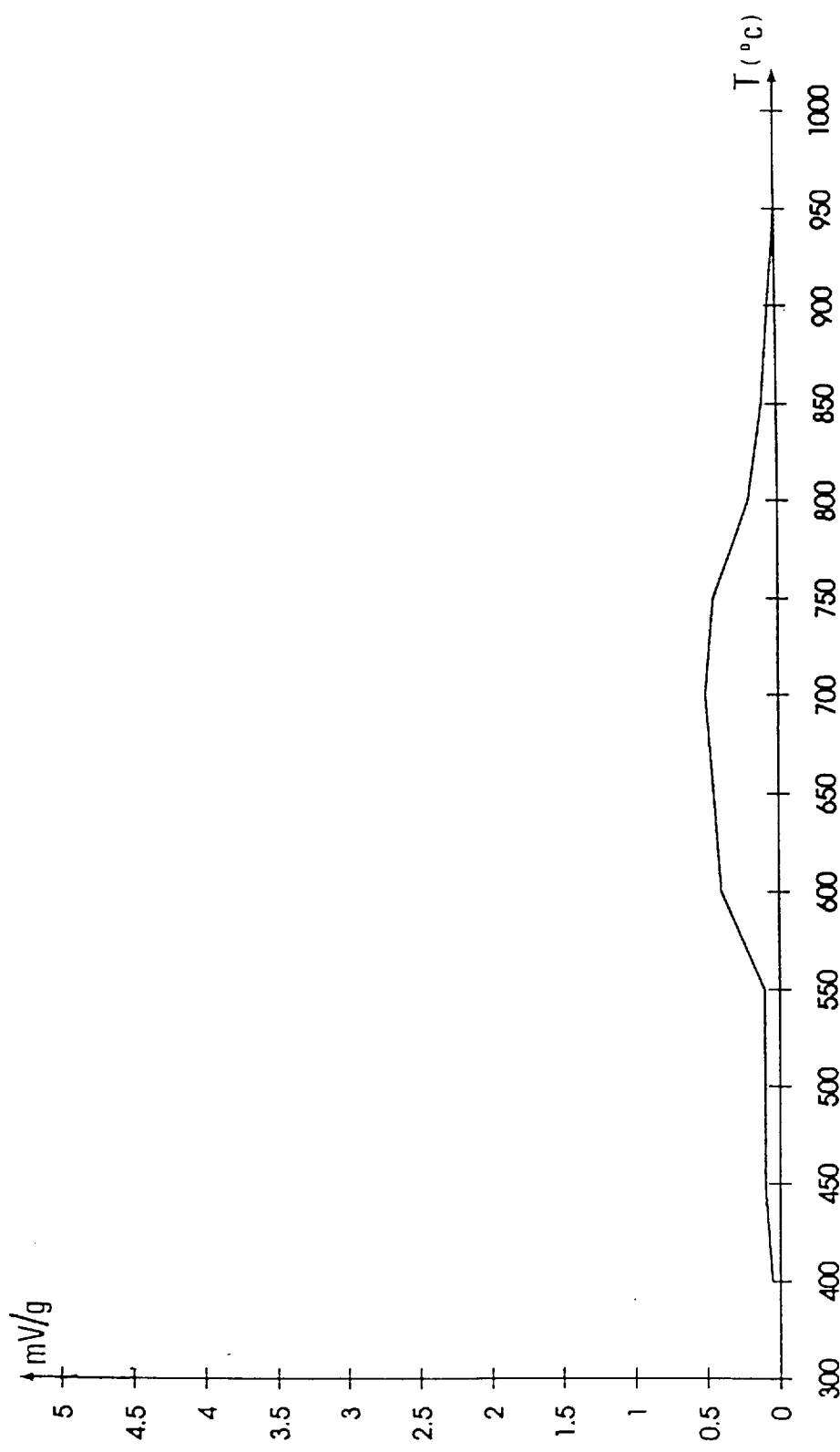
FIG. 6 represents the evolution of the volume of oxygen consumed by catalyst (C4) (in $cm^3$ of oxygen per gram of catalyst) as a function of temperature during temperature programmed oxidation.

Comparison of FIGS. 4 and 6 show that catalyst (C4) was not capable of consuming oxygen, contrary to catalyst (C1) in accordance with the invention.

Formulations ($C_1$), (C3) and (C4) were intended to operate in a combustion process, in particular in a second catalytic step. It has been shown that the catalytic potential of these formulations is directly related to their oxidoreduction capacity. The above comparisons clearly show the superiority of catalyst (C1) over prior art catalysts (C3) and (C4).

Example 6

Preparation of a Catalyst (C5) in Accordance with the Invention.

Aluminium nitrate $Al(NO_3)_3, 9H_2O$, barium acetate $Ba(O_2C_2H_5)_2$, manganese nitrate $Mn(NO_3)_2, 4H_2O$ and magnesium nitrate $Mg(NO_3)_2, 6H_2O$ were added to deionized water. When the crystals were completely dissolved, stirring was continued for one hour to homogenize the mixture. Keeping the temperature constant at between 20° C. and 100° C., co-precipitation was carried out using ammonium carbonate to obtain an overall pH or 9. The precipitate obtained was filtered and washed with distilled water to eliminate the excess ammonium carbonate and the ammonium nitrate resulting from precipitation. The filtration cake was oven dried for 12 hours at 120° C., then calcined in air in an alumina crucible at 600° C. for four hours, then at 1200° C. in air for sixteen hours.

A catalyst (C5) was obtained with composition $BaMnMgAl_{10}O_{19-\delta}$. The BET surface area of catalyst (C5) was of the order of 15 m$^2$/g.

A coating suspension was prepared from two liters of deionized water containing powdered catalyst (C5). This suspension was ground to bring the particle size to less than 10 microns.

A 0.84 liter ceramic monolith (cordierite) with 62 cells per cm$^2$ was immersed in the suspension, then drained before eliminating the excess suspension by blowing. The support was dried then calcined in a furnace where the temperature was held at 600° C. for two hours. These immersion, blowing and calcining steps were repeated once to deposit the equivalent of 120 g or: catalyst (C5) per liter of substrate.

Examples 7–8

Preparation of Catalysts (C6) and (C7) in Accordance with the Invention.

In order to show the necessity for a certain amount of magnesium and manganese in the catalyst, two catalysts (C6) and (C7) were prepared using the method described in Example 6, changing the proportions of manganese and magnesium. Catalyst (C6) was obtained with composition $BaMnMg_{0.5}Al_{10.5}O_{19-\delta}$ and catalyst (C7) was obtained with composition $BaMn_{0.5}Mg_{0.5}Al_{11}O_{19-\delta}$. The BET surface area of these catalysts was of the order of 15 m$^2$/g.

Two coated monoliths were then prepared with catalyst (C6) and (C7) respectively using the method described in Example 6.

Example 9 (comparative)

Preparation of Catalyst (C8).

In order to show the coupled effect of magnesium and manganese on the catalytic activity of catalyst (C5), catalyst (C8) was prepared in strictly similar fashion to that of Example 6 above, the only difference being the absence of manganese in the formulation. The composition of this catalyst (C8) was $BaMgAl_{11}O_{19-\delta}$. A monolith coated with catalyst (C8) was prepared using the method described in Example 6.

Example 10 and 11 (comparative)

Preparation of Catalysts (C9) and (C10).

In order to demonstrate the coupled effect of magnesium and manganese on the catalytic activity or catalyst (C5), catalysts (C9) and (C10) were prepared using the method described in Example 4 of European patent EP-B1-0 270 203 from a solution in isopropyl alcohol of barium alkoxide, aluminium isopropoxide and an aqueous solution of manganese nitrate. Catalyst (C9) was obtained with a composition of $BaMnAl_{11}O_{19-\delta}$ and catalyst (C10) was obtained with composition $BaMn_2Al_{10}O_{19-\delta}$. The BET surface area of these catalysts was of the order of 15 m$^2$/g.

Example 12 (comparative)

Preparation of catalyst (C11).

Catalyst (C11) was prepared by substituting barium by strontium in the method described in Example 6. Catalyst (C11) was obtained with composition $SrMnAl_{11}O_{19-\delta}$. The BET surface area of this catalyst was of the order of 15 m$^2$/g.

A monolith coated with catalyst (C11) was prepared using the method described in Example 6.

Example 13

Catalytic Activity of Catalysts (C5) to (C11).

Performances of the catalysts were compared for the combustion of methane, the principal constituent of natural gas.

1.5 cm diameter and 5 cm long cylinders were cut in the longitudinal direction of the channels from prepared catalysts (C5) to (C11). X ray diffraction analysis showed that the powder of the coating layer was identical to the initial powder.

The tests were carried out in a laboratory reactor comprising a tube into which the catalyst was introduced. This tube was placed in the center of a cylindrical furnace which could reach a temperature of 1500° C. An air-methane mixture containing 3.5% by volume of methane was prepared using mass flow rate regulators and passed to the reactor inlet. The reaction mixture was heated at a rate of 5° C./min from 250° C. to 875° C. The hourly flow rate of the gas was 50000 times greater than the volume of the substrate (VVH=50000 h$^{-1}$). The methane concentration at the reactor inlet and outlet was (determined using a flame ionization detector (JUM Engineering analyzer, model FID 3-300). The methane conversion was the percentage ratio of the concentration difference of methane between the inlet and outlet over the inlet concentration.

Table 2 shows the compositions of catalysts (C5) to (C11) and the temperatures required to obtain 10%, 50% and 90% conversion of the methane introduced into the reactor. Table 2 clearly shows the synergistic effect between the manganese and the magnesium which results in improved catalytic activity for the catalysts prepared in accordance with the invention.

Figure 8:
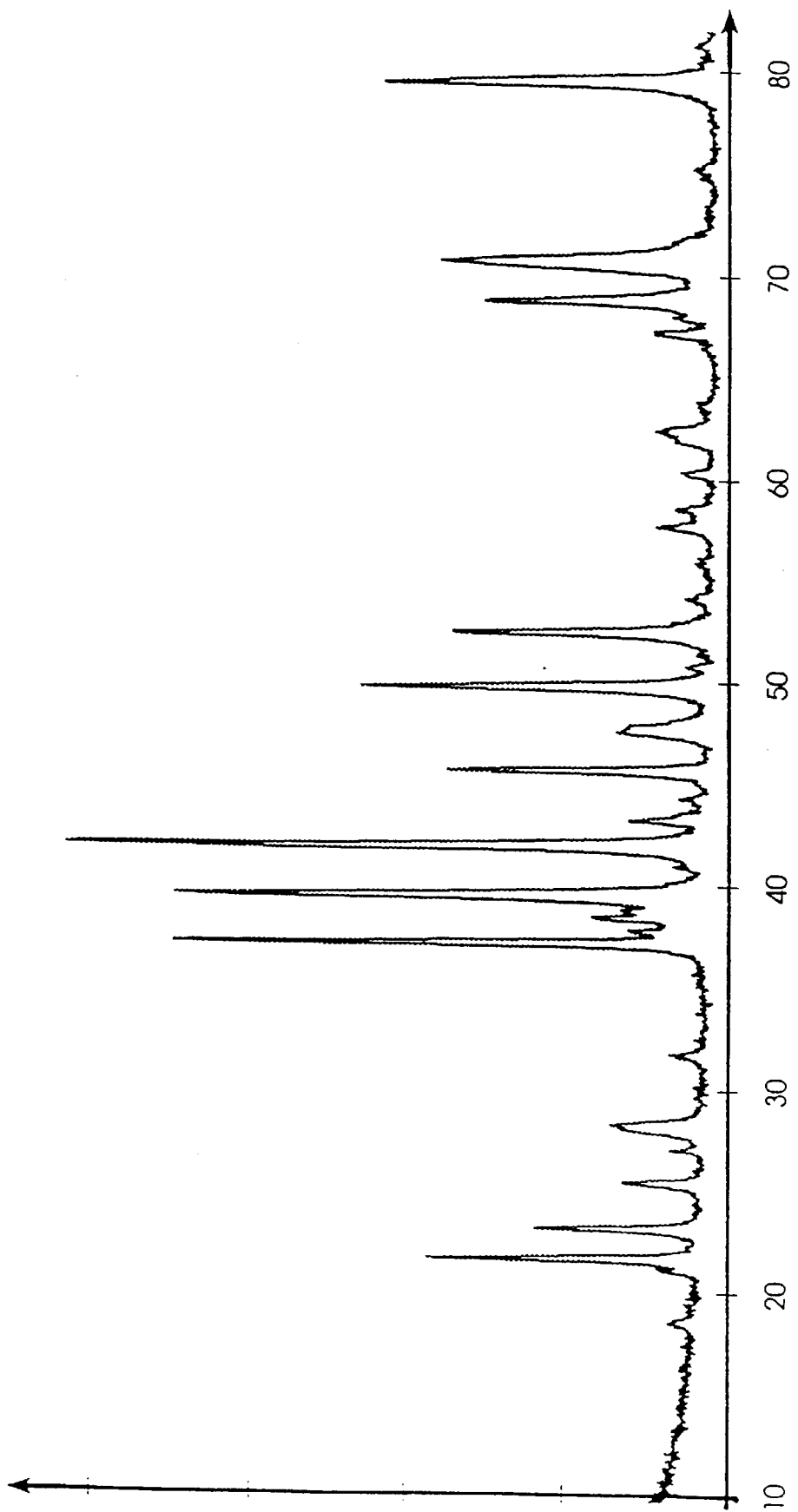

$LaMgAl_{10}O_{18-\delta}$. FIG. 8 show that catalyst (C13) had the characteristic lines of a hexaaluminate structure.

TABLE 2

Composition of catalyst (C5) to (C11) and conversions of these catalysts.

| Example number | Catalyst reference | Composition | T (conversion %) | | |
|---|---|---|---|---|---|
| | | | T (10%) | T (50%) | T (90%) |
| Example 6 (inventive) | (C5) | $BaMnMgAl_{10}O_{19-\delta}$ | 634 | 669 | 682 |
| Example 7 (inventive) | (C6) | $BaMnMg_{0.5}Al_{10.5}O_{19-\delta}$ | 677 | 683 | 684 |
| Example 8 (inventive) | (C7) | $BaMn_{0.5}Mg_{0.5}Al_{11}O_{19-\delta}$ | 686 | 716 | 717 |
| Example 9 (comparative) | (C8) | $BaMgAl_{11}O_{19-\delta}$ | >875 | >875 | >875 |
| Example 10 (comparative) | (C9) | $BaMnAl_{11}O_{19-\delta}$ | 671 | 699 | 700 |
| Example 11 (comparative) | (C10) | $BaMn_2A_{11}O_{19-\delta}$ | 696 | 718 | 720 |
| Example 12 (comparative) | (C11) | $SrMnAl_{11}O_{19-\delta}$ | 707 | 728 | 729 |

Catalysts (C5) containing both manganese and magnesium had conversion temperatures (10%, 50% and 90%) which were lower than those of prior art catalysts (C9) and C10) containing only manganese and those of catalyst (C8) containing only magnesium. The synergistic effect of magnesium and manganese is clearly shown by these comparisons.

Catalyst (C5) had conversion temperatures (10%, 50% and 90%) which were lower than those of catalysts (C6) and (C7) containing less manganese and magnesium. A certain quantity of magnesium and manganese is thus necessary to obtain high catalytic activity.

Examples 14 to 17 (comparative)

Preparation of Catalysts (C12) to (C15).

In order to show the necessity of obtaining a Lamellar hexaaluminate structure where the magnesium and manganese are incorporated into the structure, four catalysts (C12), (C13), (C14) and (C15) were prepared.

Figure 7:
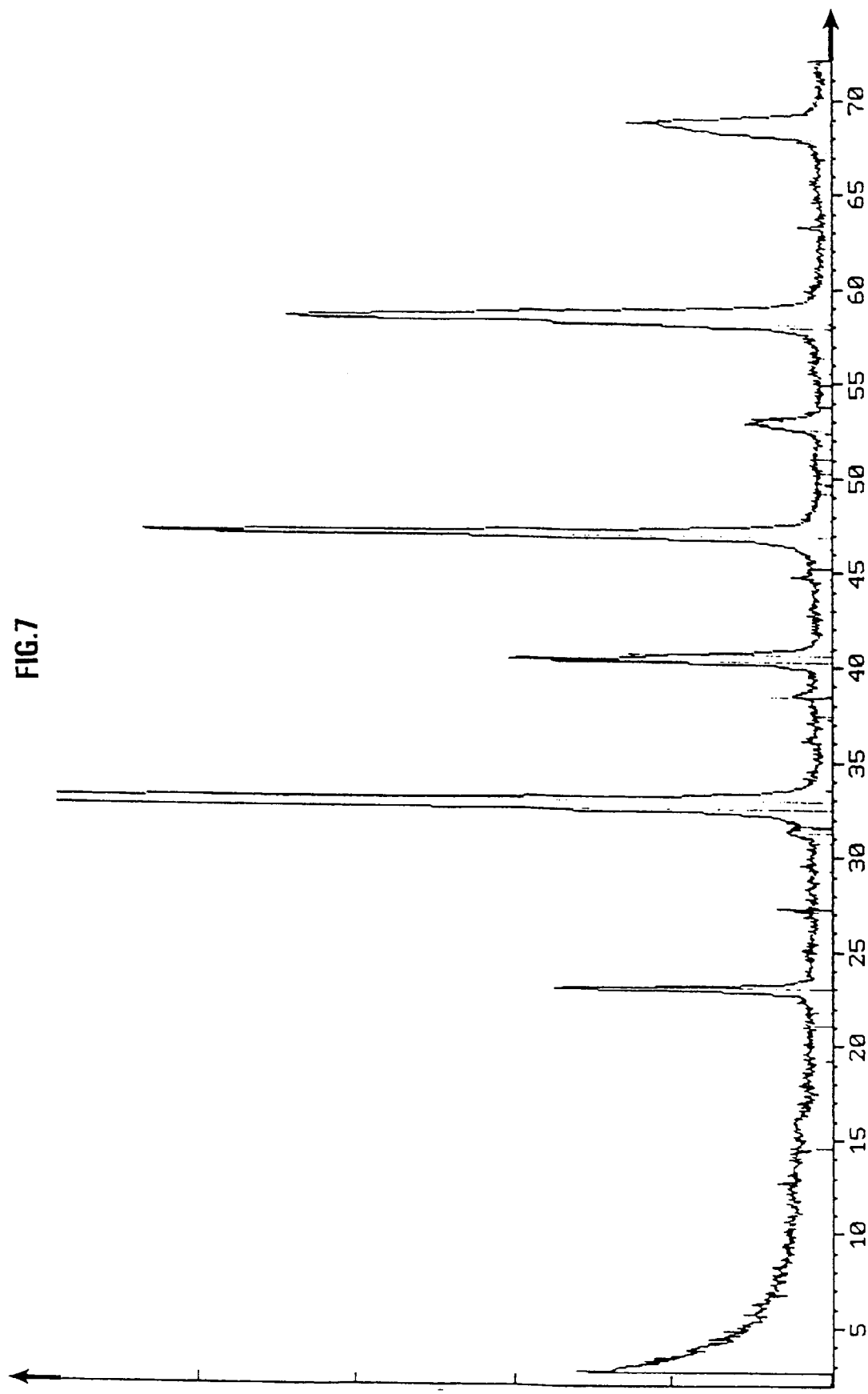
FIGS. 7 and 8 represent the X ray diffraction spectra of comparative catalysts (C13) and (C14) after calcining in air at 1200° C. for 16 hours.

Catalyst (C12) was prepared using the method described in Example 1 of European patent application EP-A-0 089 199 from a mixture of lanthanum and manganese oxides. Catalyst (C12) was obtained with a structure $LaMnO_3$. FIG. 7 shows that catalyst (C12) had the characteristic lines of a perovskite structure $LaMnO_3$. No hexaaluminate structure $LaMnAl_{11}O_{18-\delta}$ was observed.

Catalyst (C13) was prepared using the method described in Example 1. Catalyst (C13) had composition Catalysts (C14) was prepared from an intimate mixture of catalysts (C12) and (C13), the mixture being hearted to 1200° C. for sixteen hours to encourage the solid state reaction.

A precursor of type $Mn_5AlLaMg(CO_3)(OH)_{16} \cdot n H_2O$ had prepared using the method described in Example 1 of European patent application EP-A-0 044 117. This precursor would have had a structure similar to the mineral pyroaurite, see M. R. Gelsthorpe, B. C. Lippens, J. R. H. Ross and R. M. Sambrook in Proc. 9th IberoAmer. Symposium on Catalysis, Lisbon, 1984, Volume 2, pp 1082–1091. Calcining this compound led to formation of separate phases comprising simple oxides such as $Mn_3O_4$ and $Al_2O_3$ and double oxides such as $Mn_2AlO_4$, $MgAl_2O_4$ and $LaAlO_3$ which constituted catalyst (C15).

Example 18

Catalytic Activity of Catalysts ($C_1$) and (C12) to (C15)

Five monoliths were prepared each respectively coated with a catalyst (C1), (C12), (C13), (C14) an (C15) using the method described in Example 6. Cylinders 1.5 cm in diameter and 5 cm in length were cut in the longitudinal direction of the channels from prepared catalysts (C12) to (C15). The catalytic activity was measured using the procedure described in Example 13.

TABLE 3

Composition of catalyst (C11) to (C13) and conversions of these catalysts.

| Example number | Catalyst reference | Composition | T (conversion %) | | |
|---|---|---|---|---|---|
| | | | T (10%) | T (50%) | T (90%) |
| Example 1 (inventive) | (C1) | $La_{0.78}Mg_{0.9}Mn_{0.9}Al_{11}O_{19-\delta}$ | 675 | 680 | 685 |

TABLE 3-continued

Composition of catalyst (C11) to (C13) and
conversions of these catalysts.

| Example number | Catalyst reference | Composition | T (conversion %) | | |
|---|---|---|---|---|---|
| | | | T (10%) | T (50%) | T (90%) |
| Example 14 (comparative) | (C12) | LaMnO$_3$ | >875 | >875 | >875 |
| Example 15 (comparative) | (C13) | LaMgAl$_{30}$O$_{19-\delta}$ | >875 | >875 | >875 |
| Example 16 (comparative) | (C14) | LaMgAl$_{10}$O$_{19-\delta}$ -LaMnO3 (comixture) | >875 | >875 | >875 |
| Example 17 (comparative) | (C15) | mixed oxides | >875 | >875 | >875 |

Catalysts (C12) with a perovskite structure had no catalytic activity, contrary to catalyst (C1) of the invention. Catalyst (C13) with a hexaaluminate structure had no catalytic activity, contrary to catalyst (C1) of the invention. Catalyst (C14), otained from a mechanical mixture of a perovskite structure catalyst and a hexaaluminate sturcture catalyst, had no catalytic activity, contrary to catalyst (C1) of the invention. Finally, catalyst (C15) had no catalytic activity, contrary to catalyst (C1) of the invention.

Table 3 clearly shows the necessity for the two active elements manganese and magnesium to be intimately bound to the hexaaluminate structure in order to produce a catalytic activity.

I claim:

1. A non-selective high temperature resistant oxidation catalyst comprising a lamellar hexaaluminate of the formula $A_{1-x}B_yC_zAl_{12-y-z}O_{19-\delta}$, where A represents barium, strontium or a rare earth with a valency X; B represents at least one element with valency Y which is Mn, Co or Fe; C represents at least one of Mg or Zn; x has a value of 0 to 0.25, y has a value of 0.5 to 3 and z has a value of 0.01 to 3; the sum y+z has a maximum value of 4 and δ has a value which substantially complies with the oxidation state of the elements in the catalyst.

2. A catalyst according to claim 1, wherein the atomic ratio of A to the sum B+C+Al is about 0.0625 to 0.083.

3. A catalyst according to claim 1, wherein element A is lanthanum or barium, element B is manganese and element C is magnesium.

4. A catalyst according to claim 1 wherein the values of y and z are respectively between 0.5 and 2 and between 0.01 and 2.

5. A catalyst according to claim 1, wherein in formula $A_{1-x}B_yC_zAl_{12-y-z}O_{19-\delta}$ element B and element C are incorporated into the structure of the lamellar hexaaluminate.

6. A catalyst according to claim 1, having a specific surface area of 10 to 100 m$^2$/g after calcining at 1200° C.

7. A catalyst according to claim 1, wherein the hexaaluminate $A_{1-x}B_yC_zAl_{12-y-z}O_{19-\delta}$ is supported on a metallic or ceramic substrate.

8. A catalyst according to claim 7, wherein substrate is a monolithic material with a cellular structure.

9. A catalyst according to claim 1, wherein the hexaaluminate $A_{1-x}B_yC_zAl_{12-y-x}O_{19-\delta}$ is formed into a monolithic material with a cellular structure.

10. A catalyst according to claim 1, further comprising a precious metal from the platinum group on the catalyst surface or incorporated into the catalyst during preparation.

11. A process for the preparation of a non-selective high temperature resistant catalyst according to claim 1, comprising dissolving and mixing a water and/or alcohol-soluble aluminium compound, a water and/or alcohol-soluble compound of an element A which is barium, strontium or a rare earth, a water and/or alcohol-soluble compound of an element B which is Mn, Co or Fe, and a water and/or alcohol-soluble compound of an element C which is magnesium or zinc, such that the atomic ratio of A over the sum B+C+Al is about 0.0625 to 0.083, the atomic ratio of B over the sum B+C+Al is about 0.04 to 0.2, and the atomic ratio of C over the sum B+C+Al is about 0.01 to 0.2, precipitating, hydrolysing and/or thermally decomposing to form a product in the solution, extracting the product form the solution and calcining the extracted product at a temperature greater than at least 900° C.

12. A preparation process according to claim 11, wherein co-precipitation is carried out by (a) preparing a mixture containing a water soluble aluminium salt, a water soluble salt of at least one element A, a water soluble salt of at least one element B, and a water soluble salt of at least one element C; (b) carrying out co-precipitation of the hydroxides or carbonates of the soluble salts used in (a); (c) drying the co-precipitate and pre-calcining between 200° C. and 650° C., and (d) calcining the product obtained at a temperature of between 900° C. and 1500° C. for 5 to 30 hours.

13. A preparation process according to claim 11, wherein element A is lanthanum or barium, element B is manganese and element C is magnesium.

14. In the catalytic combustion of hydrocarbons, carbon monoxide, hydrogen or mixtures thereof, the improvement comprising conducting the combustion in contact with a catalyst according to claim 1.

15. A combustion process using two catalytic zones, characterised in that the catalyst in the first catalytic zone comprises palladium and/or platinum on an alumina stabilised by at least one element selected from the group composed of barium, lanthanum, silicon and tin and in that the catalyst in the second catalytic zone is a catalyst according to claim 1.

16. A catalyst according to claim 1, wherein element B is manganese and element C is magnesium.

17. A process for the preparation of a non-selective high temperature resistant catalyst according to claim 1, comprising calcining, at a temperature effective to produce a hexaaluminate, of a precipitate, hydrolysis or thermal decomposition product of a solution comprising a water and/or alcohol-soluble compound of an element A which is barium, strontium or a rare earth, a water and/or alcohol-soluble compound of an element B which is Mn, Co or Fe, and a water and/or alcohol-soluble compound of an element C which is magnesium or zinc, such that the atomic ratio of A over the sum B+C+Al is about 0.0625 to 0.083, the atomic ratio of B over the sum B+C+Al is about 0.04 to 0.2, and the atomic ratio of C over the sum B+C+Al is about 0.01 to 0.2.

18. A process according to claim 11, wherein precipitating, hydrolyzing or decomposing are conducted at a pH of 7 to 12.

19. A process according to claim 17, wherein precipitating, hydrolyzing or decomposing to produce the decomposition product are conducted at a pH of 7 to 12.

20. A catalyst according to claim 1, wherein $\delta$ is determined as a function of the respective valencies X and Y of elements A and B and the value of x, y and z and is equal to $1-\frac{1}{2}\{(1-x)X+yY-3y-z\}$.

* * * * *